UNITED STATES PATENT OFFICE.

ARCHIBALD FIGGINS, OF RICHMOND, VICTORIA, AUSTRALIA, ASSIGNOR TO JACOB HYAM NATHAN, OF ST. KILDA, VICTORIA, AUSTRALIA.

FLUX FOR USE IN BRAZING CAST-IRON AND OTHER METALS.

1,275,412.     Specification of Letters Patent.     Patented Aug. 13, 1918.

No Drawing.     Application filed January 18, 1917. Serial No. 143,106.

*To all whom it may concern:*

Be it known that I, ARCHIBALD FIGGINS, a subject of the King of Great Britain, residing at No. 9 Corsair street, Richmond, in the State of Victoria, Commonwealth of Australia, have invented a new and useful Flux for Use in Brazing Cast-Iron and other Metals, of which the following is a specification.

This invention relates to an improved flux for use in brazing cast iron in particular, but useful also for brazing other metals, and it has been devised in order to provide a flux which can be manufactured economically and is found to be highly efficient in metal brazing operations.

In carrying the invention into effect sodium bi-borate: sodium carbonate: sodium chlorid: soda ash and chlorid of gold are suitably admixed to produce a powdered flux.

The proportions by weight of the ingredients employed in the manufacture of the improved flux are approximately as hereunder:—

| | |
|---|---|
| Sodium bi-borate | 38% |
| Sodium carbonate | 19% |
| Sodium chlorid | 38% |
| Soda ash | 4.96% |
| Chlorid of gold equivalent to pure metallic gold | .04% |

The sodium carbonate and sodium chlorid are dried and sifted finely in any approved way and then thoroughly admixed. The sodium bi-borate and soda ash are sifted finely and then thoroughly admixed with the sodium carbonate and sodium chlorid.

The chlorid of gold is then added to the other ingredients and thoroughly admixed therewith by stirring or in any other suitable way.

The manner of employing a flux made in accordance with the present invention is as follows:—

The pieces of cast iron or other metals to be brazed together are clamped tightly together and then heated to a cherry color or to approximately eight hundred degrees Fahrenheit in a furnace or fire heated by charcoal or oil fuel.

The pieces of cast iron or other metals are then taken from the furnace and the flux is applied over the junction of the parts to be brazed together. The heat of the metal liquefies the flux in which state it passes readily between and forms a coating on the adjacent surfaces to be brazed.

A bar of spelter is then melted and run into the space between the surfaces to be brazed by the flame of a suitable blow-pipe or jet and a borax flux in the ordinary way.

The flame of the blow-pipe or jet keeps the temperature of the metals being brazed approximately at eight hundred degrees Fahrenheit and insures the flux comprising the present invention being kept in a proper condition for insuring the most satisfactory results.

A flux prepared and employed in accordance with the foregoing description will be found thoroughly efficient in repairing broken castings or parts of machinery or the like in a highly satisfactory manner.

What I do claim is:—

A flux for brazing cast iron and other metals comprising an intimate mixture, sodium bi-borate 38%, sodium carbonate 19%, sodium chlorid 38%, soda ash 4.96% and chlorid of gold .04%.

In testimony whereof I affix my signature in presence of two witnesses.

ARCHIBALD FIGGINS.

Witnesses:
JAMES H. ANDERSON,
EDITH A. NEWALL.